(12) United States Patent
Sprenger

(10) Patent No.: US 9,395,903 B2
(45) Date of Patent: Jul. 19, 2016

(54) SHARING INFORMATION BETWEEN COMPUTING DEVICES

(71) Applicant: Intel Corporation, Santa Clara, CA (US)

(72) Inventor: Mark E. Sprenger, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 13/977,222

(22) PCT Filed: Mar. 13, 2013

(86) PCT No.: PCT/US2013/030743
§ 371 (c)(1),
(2) Date: Jun. 28, 2013

(87) PCT Pub. No.: WO2014/142818
PCT Pub. Date: Sep. 18, 2014

(65) Prior Publication Data
US 2014/0281955 A1    Sep. 18, 2014

(51) Int. Cl.
*G06F 3/00* (2006.01)
*G06F 3/0488* (2013.01)
*G06F 3/01* (2006.01)
*H04L 12/18* (2006.01)

(52) U.S. Cl.
CPC .............. *G06F 3/0488* (2013.01); *G06F 3/016* (2013.01); *H04L 12/1818* (2013.01); *H04L 12/1845* (2013.01)

(58) Field of Classification Search
CPC ... G06F 3/0488; G06F 3/016; H04L 12/1818; H04L 12/1845

USPC .......................................................... 715/702
See application file for complete search history.

(56) References Cited

U.S. PATENT DOCUMENTS 8,391,719 B2 *  3/2013  Alameh .............. H04M 1/7253
                                                            398/115
8,631,355 B2 *  1/2014  Murillo .................. A63F 13/06
                                                            715/863

(Continued)

FOREIGN PATENT DOCUMENTS

KR    1020080036090 A    4/2008
KR    1020120028757 A    3/2012

OTHER PUBLICATIONS

International Search Report and Written Opinion received for International Patent Application No. PCT/US2013/030743, mailed on Aug. 30, 2013, 11 pages.

(Continued)

*Primary Examiner* — David Phantana Angkool
(74) *Attorney, Agent, or Firm* — Barnes & Thornburg LLP

(57) ABSTRACT

Technologies for sharing information between computing devices comprises determining a location of a recipient destination computing device relative to a source computing device and transmitting information data to the recipient destination computing device based on an input gesture received on the source computing device and the relative location of the recipient computing device. The information data is usable by the recipient destination computing device to access the shared information. The input gesture may be embodied as a tactile or non-tactile gesture that indicates the relative location of the recipient computing device to which the information is to be shared.

25 Claims, 9 Drawing Sheets

(56) References Cited

U.S. PATENT DOCUMENTS

| | | | | |
|---|---|---|---|---|
| 8,773,352 B1* | 7/2014 | Huang | | G09G 5/00 345/156 |
| 8,819,812 B1* | 8/2014 | Weber | | G06F 3/017 726/18 |
| 8,825,474 B1* | 9/2014 | Zhai | | G06F 17/276 704/1 |
| 8,854,433 B1* | 10/2014 | Rafii | | G06F 3/017 348/42 |
| 9,063,563 B1* | 6/2015 | Gray | | G06F 3/01 |
| 9,063,574 B1* | 6/2015 | Ivanchenko | | G06F 3/016 |
| 2005/0091610 A1 | 4/2005 | Frei et al. | | |
| 2006/0077351 A1* | 4/2006 | Park | | G09G 3/2096 353/31 |
| 2007/0041426 A1 | 2/2007 | Hashimoto | | |
| 2011/0083111 A1 | 4/2011 | Forutanpour et al. | | |
| 2012/0060109 A1 | 3/2012 | Han et al. | | |
| 2012/0268308 A1 | 10/2012 | Tuttle | | |
| 2015/0279103 A1* | 10/2015 | Naegle | | G06T 19/006 345/633 |

OTHER PUBLICATIONS

Curran et al., "RFID—Enabled Location Determination within Indoor Environments," 2009, available from <http://www.scis.ulster.ac.uk/~kevin/ijaciRfidRadar.pdf>, 21 pages.

* cited by examiner

SHARING INFORMATION BETWEEN COMPUTING DEVICES

BACKGROUND

Computing devices, such as tablet computers, smartphones, and smart appliances, are becoming ubiquitous tools for personal, business, and social uses. Many computing devices facilitate the user's consumption of various information including videos, movies, music, and web content. However, many personal computing devices provide only for individual consumption of the information. As such, users of personal computing devices often "share" information with users of other personal computing devices.

Sharing information between computing devices, however, can be cumbersome and difficult. In many cases, users must resort to the use of some type of underlying application to share the information such as a texting, e-mail, or social networking application. The use of such underlying applications add further complexity and limitations to the sharing of information, especially in those situations in which the underlying application is not dedicated to the sharing of information between computing devices. As such, users may resort to manually accessing the information on the other computing device rather than sharing information between the devices. For example, in the case in which a user desires to share a website to another user, the other user may be forced to simply type in the web address of the website and manually access the website on his/her computing device without the sharing of information between the devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
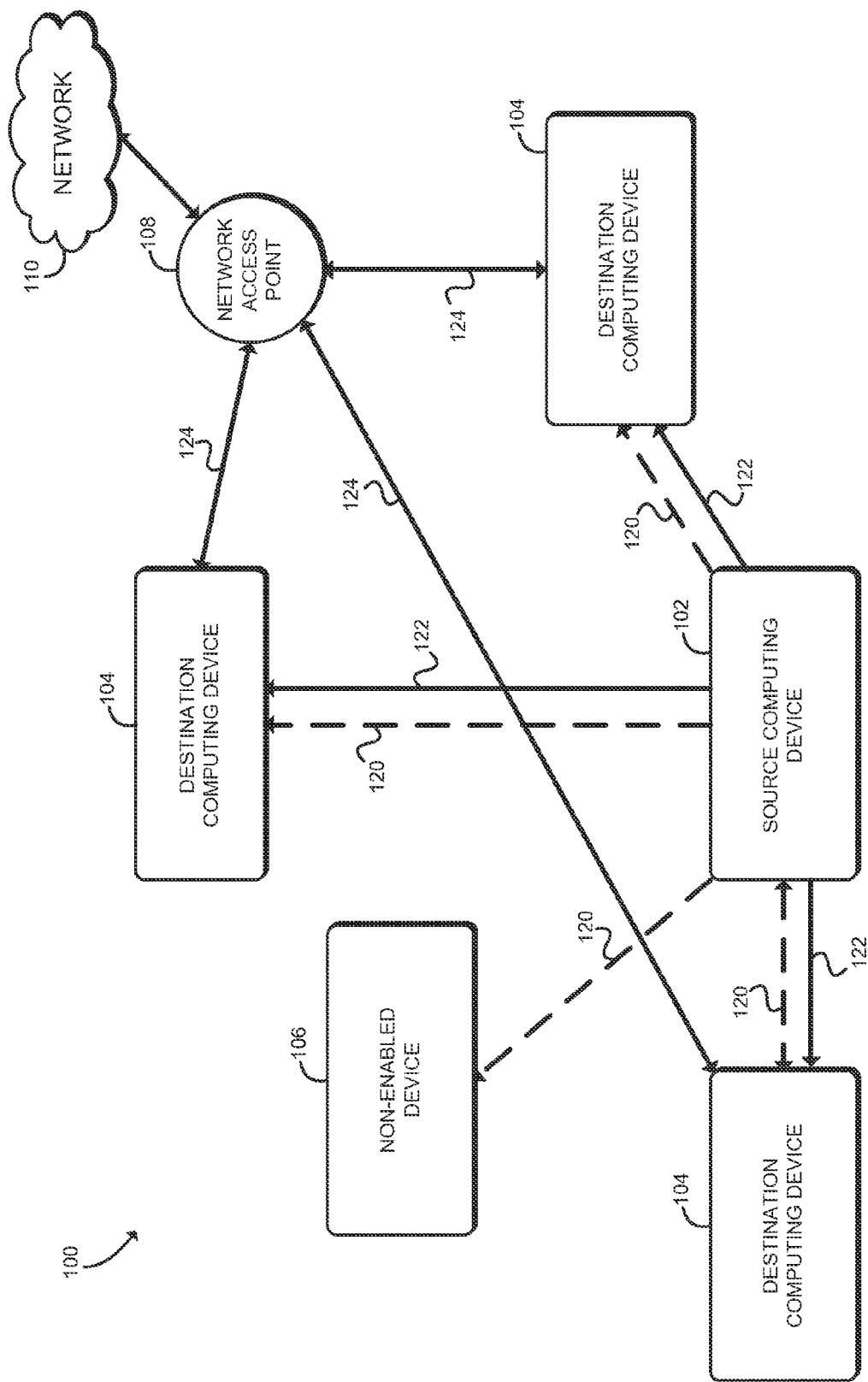
FIG. 1 is a simplified block diagram of at least one embodiment a system for sharing information between computing devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for sharing information between computing devices includes a source computing device 102 and one or more destination computing devices 104. As discussed in more detail below, the source computing device 102 is configured to determine the relative location and identity of each designation computing device 104 based on response signals received therefrom. A user of the source computing device 102 may share information, such as videos, pictures, web links, files, and/or other information, with one or more of the destination computing device 104 by selecting the information to be shared and moving the information toward the selected destination computing device 104. To do so, the user of the source computing device 102 uses an input gesture, such as a tactile gesture (e.g., a swipe gesture) and/or a non-tactile gesture (e.g., a perceptual gesture such as hand or eye motion), that is directed generally toward the desired destination computing device 104. For example, the use may "flick" or swipe a picture, video, or other information toward the desired destination computing device 104 using a touchscreen display or other perceptual input system of the source computing device 102. The source computing device 102 determines the recipient destination computing device 104 based on the input gesture and the determined location of each of the destination computing devices 104. For example, the source computing device 102 may infer the destination computing device 104 with which the user desires to share information by comparing the input gesture and the current location of each of the destination computing devices 104 (i.e., which of the destination computing device 104 the input gesture is directed toward).

After the recipient destination computing device 104 has been determined, the source computing device 102 transmits information data to the recipient destination computing device 104 using a communication link 122, which may be different from the communication link 120 used to transmit the identification data of the responding destination computing device 104. As discussed in more detail below, the information data may be embodied as any type of data usable by the recipient destination computing device 104 to access the information to be shared. For example, the information data may be embodied as location data that identifies a location (e.g., a web address) from which the recipient destination computing device 104 may access the information to be shared, as application data that causes execution of and/or controls the behavior of an application stored on the recipient destination computing device 104 to present the information to be shared to a user of the recipient destination computing device 104, as the information to be shared and presented to the user (e.g., in those embodiments in which the information to be shared is relatively small), and/or as any other type of information usable by the recipient destination computing device 104 to access, or otherwise produce, the information to be shared.

As discussed above, the recipient destination computing device 104 uses the information data received from the source computing device 102 to access, generate, or otherwise produce the information to be shared. For example, in embodiments in which the information data is embodied as location data, the recipient destination computing device 104 accesses the information from the location identified by the information data. To do so, the destination computing device 104 may access, for example, a network 110 using a local network access point 108 of the system 100 via a communication link 124, which may be different from the communication link 120 used to transmit the identification data (i.e., receive and respond to interrogation signals) and/or the communication link 122. The destination computing device 104 may download or access the information located at the identified location and subsequently present the accessed information to a user of the recipient destination computing device 104. In this way, a user of the source computing device 102 may quickly and conveniently share information with one or more of the destination computing device 104 without the use of underlying applications (e.g., texting or e-mail applications), the establishment of a complex communication network between the computing devices 102, 104, and/or the transfer of large amounts of data directly between the computing devices 102, 104.

The network access point 108 may be embodied as any type of network access point and/or network devices accessible by the destination computing devices 104 to access shared information. For example, the network access point 108 may be embodied as a network router, switch, or hub. Additionally, the network access point 108 may be embodied as a private, public, or semi-public network access point. Similarly, the network 110 may be embodied as any type of network capable of facilitating communications between the destination computing devices 104 and the location of shared information (e.g., a remote website or data server). In the illustrative embodiment, the network 110 is embodied as a publicly accessible, global network such as the Internet. The network 110 may include any number of additional devices, such as additional remote hosts, computers, routers, and switches, to facilitate communications over the network 110.

In some embodiments, the system 100 may also include one or more non-enabled devices 106. The non-enabled device 106 may be embodied as any type of device that is not enabled to respond to interrogation signals transmitted by the source computing device 102 to determine the identity of the destination computing devices 104 as discussed in more detail below. For example, the non-enabled device 106 may be embodied as a computing device that is not configured to respond to the interrogation signals, a non-computing or electronic device incapable of responding to the interrogation signals, and/or other devices or structures incapable of responding to the interrogation signals.

The source computing device 102 and each of the destination computing devices 104 may be similar or different devices. For example, each of the computing devices 102, 104 may be embodied as any type of computing device capable of performing the functions described herein including, but not limited to, a mobile computing device, a tablet computer, a smartphone, a laptop computer, a mobile media device, a game console or device, a mobile internet device, a desktop computer, a smart appliance such as a smart television, a network appliance, a display device, a personal digital assistant, or other computer or electronic device. In some embodiments, each of the computing devices 102, 104 may be configured to perform each of the functions described below with reference to the individual computing devices 102, 104. That is, the particular designation of a "source computing device" or a "destination computing device" may depend on whether the particular computing device 102, 104 is acting as an information source device (i.e., a user is sharing information from the particular device) or an information destination device (i.e., the device is receiving the shared information). As such, although the features and functionality of the source computing device 102 are described in detail below with regard to FIGS. 2 and 3, it should be appreciated that such description may be equally applicable to each of the destination computing devices 104.

Figure 2:
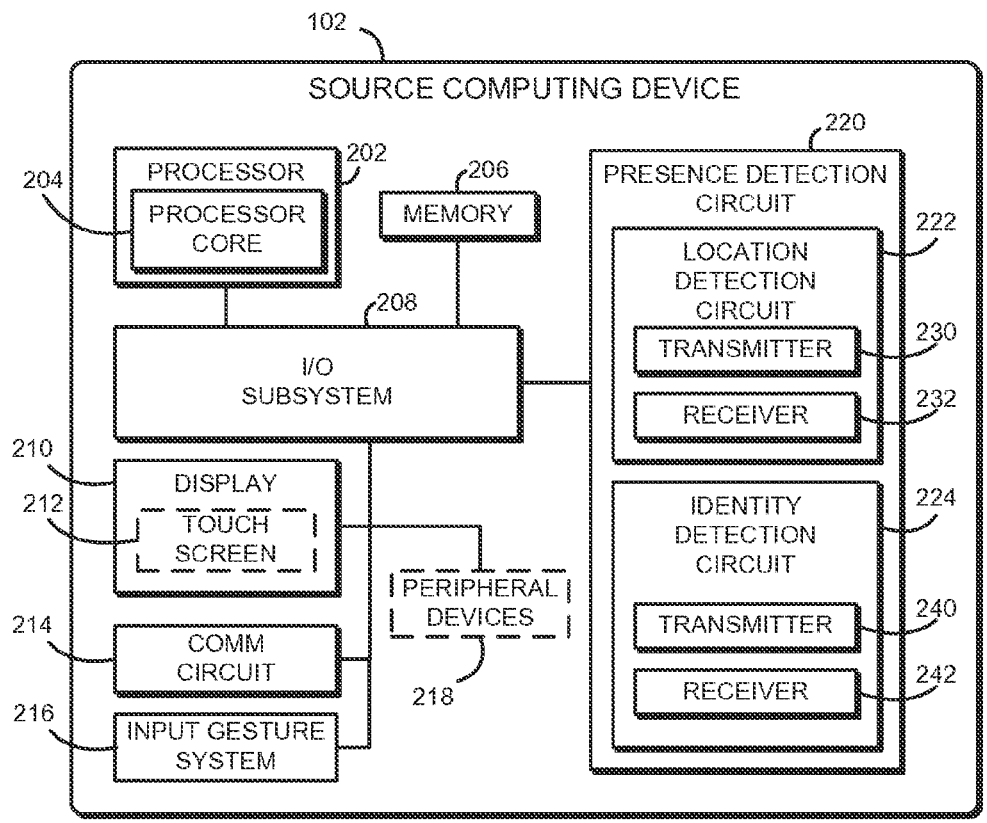
FIG. 2 is a simplified block diagram of at least one embodiment a source computing device of the system of FIG. 1.

Referring now to FIG. 2, in the illustrative embodiment, the source computing device 102 includes a processor 202, a memory 206, an input/output subsystem 208, a display 210, a communication circuit 214, an input gesture system 216, and a presence detection circuit 220. Of course, the source computing device 102 may include other or additional components, such as those commonly found in a computer, electronic, or other computing device (e.g., various input/output devices), in other embodiments. Additionally, in some embodiments, one or more of the illustrative components may be incorporated in, or otherwise from a portion of, another component. For example, the memory 206, or portions thereof, may be incorporated in the processor 202 in some embodiments.

The processor 202 may be embodied as any type of processor capable of performing the functions described herein. For example, the processor may be embodied as a single or multi-core processor(s) having one or more processor cores 204, a digital signal processor, a microcontroller, or other processor or processing/controlling circuit. Similarly, the memory 206 may be embodied as any type of volatile or non-volatile memory or data storage currently known or developed in the future and capable of performing the functions described herein. In operation, the memory 206 may store various data and software used during operation of the source computing device 102 such as operating systems, applications, programs, libraries, and drivers.

The memory 206 is communicatively coupled to the processor 202 via the I/O subsystem 208, which may be embodied as circuitry and/or components to facilitate input/output operations with the processor 202, the memory 206, and other components of the source computing device 102. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processor 202, the memory 206, and other components of the source computing device 102, on a single integrated circuit chip.

The display 210 of the source computing device 102 may be embodied as any type of display on which information may be displayed to a user of the source computing device 102. In some embodiments, for example, the display 210 may be embodied as a touchscreen display 212 and includes a corresponding touchscreen sensor 212 to receive tactile input (e.g., a tactile input gesture) and data entry from the user. The display 210 may be embodied as, or otherwise use, any suitable display technology including, for example, a liquid crystal display (LCD), a light emitting diode (LED) display, a cathode ray tube (CRT) display, a plasma display, and/or other display usable in a mobile computing device. Similarly, the touchscreen sensor 212 may use any suitable touchscreen input technology to detect tactile input gestures of the user to select or interact with information displayed on the touchscreen display 210 including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

The communication circuit 214 may be embodied as one or more devices and/or circuitry for enabling communications between the source computing device 102 and the destination computing devices 104. The communication circuit 214 may be configured to use any one or more communication technology (e.g., wireless or wired communications) and associated protocols (e.g., Ethernet, Bluetooth®, Wi-Fi®, WiMAX, etc.) to effect such communication.

The input gesture system 216 may be embodied as any device or devices configured to receive an input gesture from the user of the source computing device 102. In some embodiments, the input gesture system 216 may be configured to detect and receive tactile input gestures. For example, the input gesture system 216 may be embodied as, or otherwise include, the touchscreen 212 to receive a tactile input gesture (e.g., a swipe gesture) from the user. Additionally or alternatively, the input gesture system 216 may be configured to detect and receive other perceptual input gestures such as hand movement, eye movement, body posture or movement, and/or the like. In such embodiments, the input gesture system 216 may include various sensors to detect the perceptual input gestures such as cameras, motion sensors, and/or other sensors.

The presence detection circuit 220 may be embodied as any type of circuit or device capable of facilitating the determination of the presence (i.e., the location and identity) of the destination computing devices 104. In the illustrative embodiment, the presence detection circuit 220 includes a location detection circuit 222 and an identity detection circuit 224. The location detection circuit 222 is configured to determine the location of the destination computing devices 104 relative to the source computing device 102, and the identity detection circuit 224 is configured to determine the identity of the destination computing devices 104 (and, in some embodiments, refine the location determination of the location detection circuit 222). Of course, the presence detection circuit 220 may include additional or other circuits and/or devices in other embodiments.

The location detection circuit 222 may be embodied as any type of circuit and/or device capable of detecting or determining the relative location of the destination computing devices 104 and the non-enabled devices 106 (if included in the system 100). In the illustrative embodiment, the location detection circuit 222 is embodied as a radar circuit, such as a micropower impulse radar (MIR) circuit, but may be embodied as other types of circuits and/or devices capable of determine the relative location of the destination computing devices 104.

Illustratively, the location detection circuit 222 includes a transmitter 230 to transmit location detection signals (e.g., radar signals) toward the destination computing devices 104 and a receiver 232 to receive location response signals (i.e., reflected signals) from the destination computing devices 104 and any non-enabled devices 106 within the vicinity of the source computing device 102. The transmitter 230 may be embodied as any type of transmitter capable of transmitting location detection signals (e.g., signals of a suitable frequency and power) to generate reflection signals from the destination computing devices 104. Similarly, the receiver 232 may be embodied as any type of receiver and/or antenna system to receive the reflected response signals from the destination computing devices 104 and/or the non-enabled devices 106 in response to the location detection signals transmitted by the transmitter 230.

In some embodiments, the receiver 232 is embodied as, or otherwise includes, an antenna array having multiple, individual antennas located in different positions. In such embodiments, the location detection circuit 222 may determine the relative location of the destination computing devices 104 and/or the non-enabled devices 106, in two or three dimensions, using a triangulation technique based on the antenna signals received from each of the individual antennas. Due to the different locations of each antenna of the antenna array, the relative location of a destination computing device 104 and/or the non-enabled devices 106 may be determined based on differences of the antenna signals (e.g., time of reception of the interrogation response signals, signal strength of the interrogation response signals, etc.) and the known location of each antenna of the receiver 232.

The identity detection circuit 224 may be embodied as any type of circuit and/or device capable of determining the identity of responding destination computing devices 104. In the illustrative embodiments, the identity detection circuit 224 is embodied as a radio frequency identification (RFID) circuit, but may be embodied as other types of circuits and/or devices capable of determining the identification of the responding destination computing devices 104 in other embodiments.

Illustratively, the identity detection circuit 224 includes a transmitter 240 to transmit an interrogation signal to each of the destination computing devices 104 and a receiver 234 to receive interrogation response signals from the destination computing devices 104 in response to receipt of the interrogation signal. The transmitter 240 may be embodied as any type of transmitter capable of transmitting the interrogation signal, which may be embodied as any type of signal capable of causing a corresponding transponder of the destination computing devices 104 to transmit an interrogation response signal. In some embodiments, the transmitter 240 and the transmitter 230 may be embodied as the same transmitter. In such embodiments, the interrogation signal transmitted by the identity detection circuit 224 is embodied as the location detection signal (e.g., radar signal) transmitted by the location detection circuit 222 (i.e., the location detection signal also causes a transponder of the destination computing devices 104 to transmit an interrogation response signal). Alternatively, in embodiments in which the transmitter 230 and the transmitter 240 are different transmitters, the location detection signals transmitted by the transmitter 230 and the interrogation signals transmitted by the transmitter 240 may be related (e.g., the same frequency or related according to a pre-determined relationship) such that the interrogation response signals may be correlated by the presence detection circuit 220 to the appropriate location detection response signal.

The receiver 242 may be embodied as any type of receiver capable of receiving the interrogation response signals from the destination computing devices 104. In some embodiments, the receiver 242 and the receiver 232 may be embodied as the same receiver. Additionally or alternatively, the receiver 242 may be embodied as an antenna array having multiple, individual antennas located in different positions. In such embodiments, the identity detection circuit 224 may also be configured to determine the relative location of the responding destination computing devices 104 using a triangulation technique as discussed above and supplement or refine the location determination of the location detection circuit 222.

It should be appreciated that the presence detection circuit 220 has been described above with regard to those embodiments in which the source computing device 102 is acting as an information source device. In embodiments in which the source computing device 102 is acting as an information destination device, the presence detection circuit 220 may be configured to respond to an interrogation signal received from an information source device (e.g., one of the destination computing devices 104). For example, the receiver 242 may be configured to receive the interrogation signal from the information source device, and the transmitter 240 may be configured to transmit the interrogation response signal to the information source device.

In some embodiments, the source computing device 102 may further include one or more peripheral devices 218. Such peripheral devices 218 may include any type of peripheral device commonly found in a computer or other computing device such as data storage devices, speakers, a hardware keyboard, input/output devices, peripheral communication devices, and/or other peripheral devices.

Figure 3:
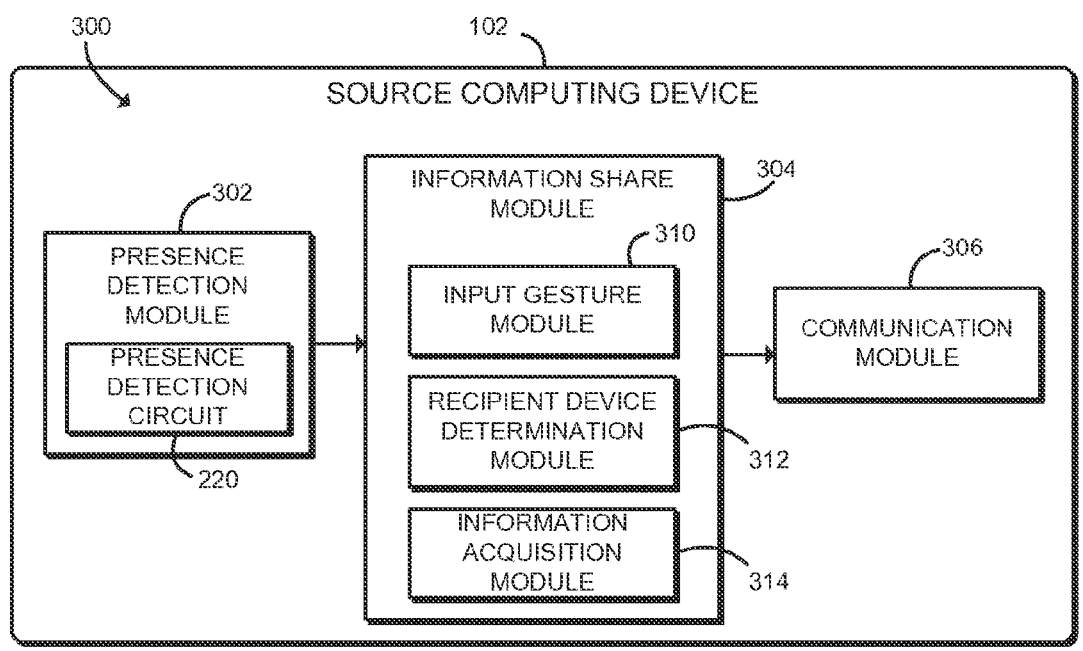
FIG. 3 is a simplified block diagram of at least one embodiment of an environment of the source computing device of FIG. 2.
Figure 4:
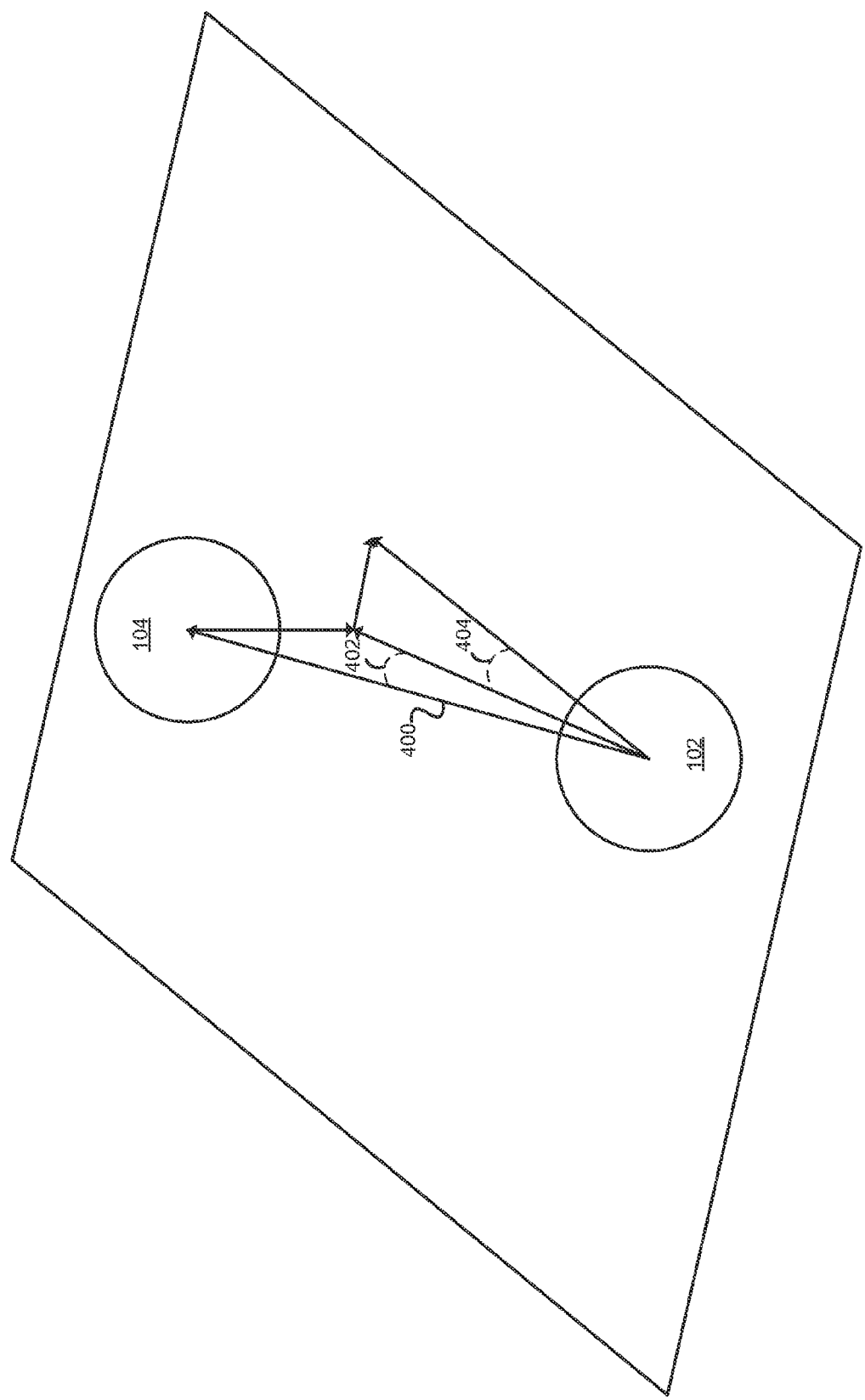
FIG. 4 is a simplified illustration of at least one embodiment of a presence detection technique used by the source computing device of FIGS. 2 and 3.

Referring now to FIG. 3, in the illustrative embodiment, the computing device 102 establishes an environment 300 during operation. The illustrative environment 300 includes a presence detection module 302, an information share module 304, and a communication module 306, each of which may be embodied as software, firmware, hardware, or a combination thereof. The presence detection module 302 is configured to determine the relative location and identity of the destination computing devices 104 based on the location detection and interrogation response signals received from each of the destination computing devices 104. As discussed above, the presence detection module 302 may utilize any suitable methodology or technology to determine the relative location such as, for example, triangulation based on signals received from each of the antennas of the receiver 232 (and receiver 242 in some embodiments) of the presence detection circuit 220. For example as shown in FIG. 4, the presence detection module 302 may be configured to determine triangulation data including, for example, a distance 400, a vertical angle 402, and a horizontal angle 404, which in combination define the location of a destination computing device 104 relative to the source computing device 102. Of course, other types of data may be determined and used to identify the relative location of the destination computing devices 104 in other embodiments.

In embodiments in which the source computing device 102 is acting as an information recipient device, the presence detection module 302 may be configured to respond to interrogation signals received from an information source device (e.g., one of the destination computing devices 104). To do so, as discussed in more detail below in regard to FIG. 9, the presence detection circuit 220 may transmit identification data in response to the interrogation signal. The identification data uniquely identifies the source computing device 102 from other computing devices of the system 100.

Referring back to FIG. 3, the information share module 304 is configured to detect a user input gesture indicative of a desire of the user to share information and to identify a recipient destination computing device 104 to receive the shared information based on the input gesture and the determined relative location of the destination computing devices 104. The information share module 304 includes an input gesture module 310 configured to detect an input gesture received from the user and determine whether the input gesture is indicative of a user's desire to share information with one or more of the destination computing devices 104. The input gesture may be embodied as any type of input gesture receivable via the input gesture system 216 and from which the information share module 304 can determine a recipient destination computing device 104. For example, the input gesture may be embodied as a tactile input gesture, such as a swipe gesture, detectable by the touchscreen 212 and generally directed toward the recipient destination computing device 104 (e.g., the user may select the information to be shared and swipe it toward the recipient destination computing device 104 using a swipe motion). Additionally or alternatively, the input gesture may be embodied as another perceptual input gesture, such as hand, eye, or body movement, detectable by suitable sensors of the input gesture system 216.

The information share module 304 also includes a recipient device determination module 312 configured to identify or determine the recipient destination computing device 104 based on the input gesture (e.g., which destination computing device 104 the input gesture is directed toward) and the determined location of each of the destination computing device 104. For example, the recipient device determination module 312 may compare the input gesture and the determined location of the destination computing devices 104 to determine or infer which destination computing device 104 with which the user desires to share information. For example, if the user swipes the information toward the determined location of one of the destination computing devise 104, the recipient device determination module 312 may infer that that particular destination computing device 104 is the desired recipient destination computing device 104.

The information share module 304 further includes an information acquisition module 314 configured to determine which information the user desires to share. The information acquisition module 314 may determine the information to be shared based on the input gesture (i.e., which information has the user selected with the input gesture). After the information to be shared has been determined, the information share module 304 determines information data usable by the recipient destination computing device 104 to access, or otherwise produce, the information to be shared. For example, in some embodiments, the information data may be embodied as location data that identifies the location (e.g., website) from which the recipient destination computing device 104 may access or retrieve the information. The location data may be embodied as any type of location data usable by the recipient destination computing device 104 to access the information such as, for example, a uniform resource locator, a web address, a data storage location, or other location data.

After the recipient destination computing device 104 and the information data corresponding to the information to be shared has been determined, the information share module 304 is configured to transmit the information data to the recipient destination computing device 104 using the communication module 306. In some embodiments, the information data may be transmitted to the recipient destination computing device 104 via the communication link 122, which is different from the communication link 120 used to transmit and receive the interrogation signals. In such embodiments, the communication module 306 is different from the presence detection module 302. However, in other embodiments, the communication module 306 may be embodied in, or otherwise form part of, the presence detection module 302.

Again, the source computing device 102 has been described with regard to FIG. 3 as an information source device. In embodiments in which the source computing device 102 is acting as an information recipient device, the information share module 304 may receive the information data from the information source device (e.g., one of the destination computing devices 104) via the communication module 306 and subsequently access or produce the information to be shared using the information data. For example, in embodiments in which the information data is embodied as location data, the source computing device 102 may access the network 110 via the network access point 108 to retrieve the information and subsequently present the information to the user of the source computing device 102. Alternatively, in embodiments in which the information data is embodied as application data, the source computing device 102 may initiate an application and present information to the user based on the information data.

Figure 5:
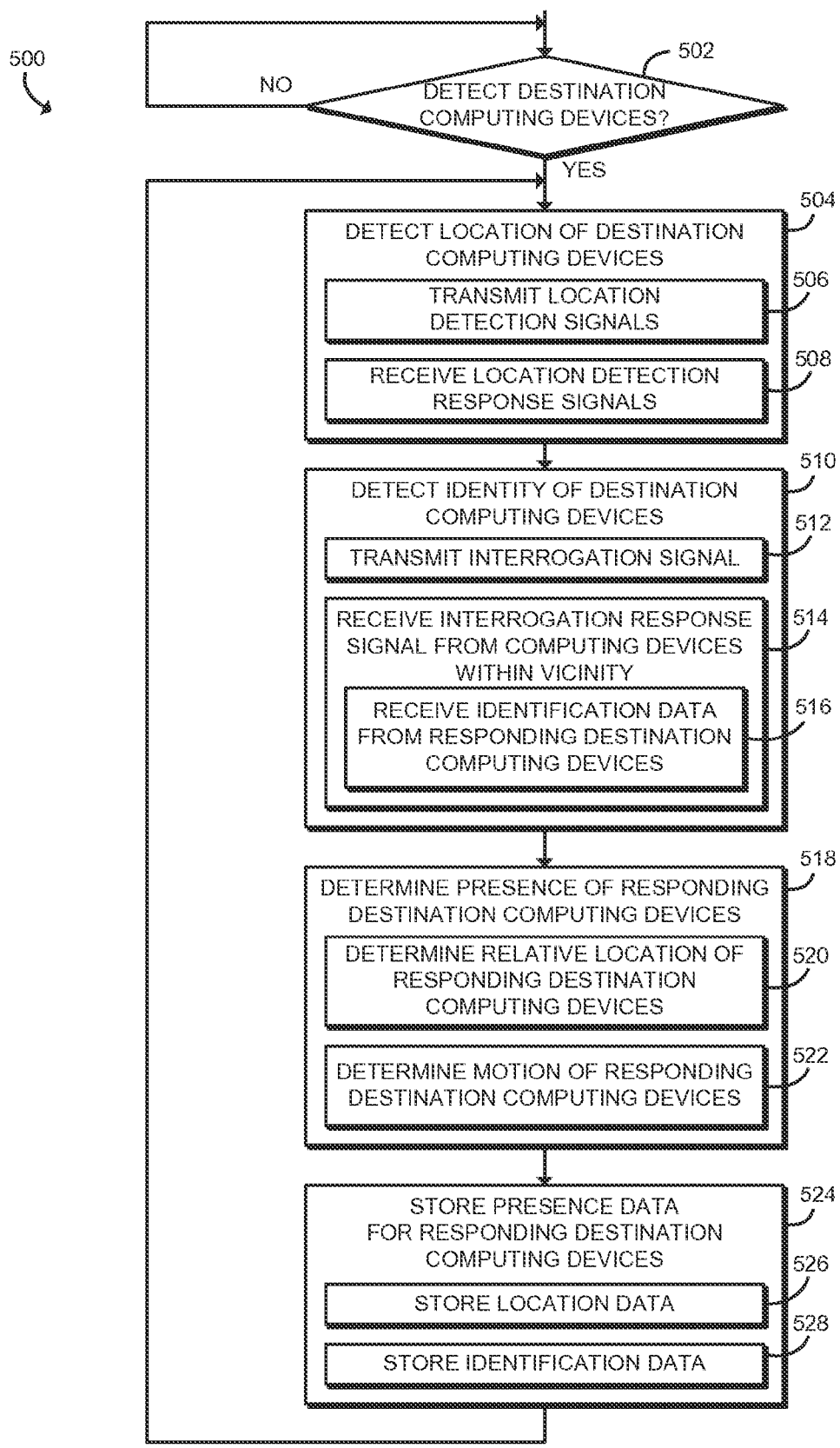
FIG. 5 is a simplified flow diagram of at least one embodiment of a method for detecting the presence of destination computing devices that may be executed by source computing devices of the system of FIG. 1.

Referring now to FIG. 5, in use, the source computing device 102 may execute a method 500 for detecting the presence (i.e., location and identity) of the destination computing devices 104. The method begins with block 502 in which the source computing device 102 determines whether to detect the presence of the destination computing devices 104. That is, in some embodiments, the user of the source computing device 102 may enable or disable the presence detection on the source computing device 102. If the presence detection is enabled, the source computing device 102 detects the location of the destination computing devices 104 in block 504. To do so, the source computing device 102 transmits the location detection signals in block 506. As discussed above, the location detection signals may be embodied as any type of signal, such as a radar signal, capable of causing or generating a location detection response signal (e.g., a reflective signal) from each of the destination computing devices 104 and the non-enabled devices 106. In some embodiments, the source computing device 102 may transmit multiple location detection signals, which may be identical or different (e.g., different frequency) to improve the location determination.

In block 508, the source computing device 102 receives the location detection response signals from each of the destination computing devices 104 within the vicinity of the source computing device 102, as well as any non-enabled devices (e.g., furniture) within the vicinity. In the illustrative embodiment, the location detection response signals are embodied as reflective signals generated off of each destination computing devices 104 and/or non-enabled device 106 in response to the location detection signal (e.g., a radar signal).

After the location detection response signals have been received in block 508, the method 500 advances to block 510 in which the source computing device 102 detects the identity of each responding destination computing device 104. To do so, the source computing device 102 transmits an interrogation signal to the destination computing devices 104 within the vicinity of the source computing device 102 in block 512. The interrogation signal may be embodied as any type of signal capable of causing the destination computing devices 104 to respond to such interrogation signal. For example, in embodiments in which the identity detection circuit 224 is embodied as a radio frequency identification (RFID) circuit, the interrogation signal may be embodied as a radio frequency identification interrogation signal configured to cause each of the receiving destination computing devices 104 to respond with an interrogation response signal. In some embodiments, a single interrogation signal may be broadcast to all destination computing devices 104 within the vicinity of the source computing device 102. Alternatively, in other embodiments, a separate interrogation signal may be transmitted to each of the destination computing devices 104.

In block 516, the source computing device 102 receives an interrogation response signal from each of the destination computing devices 104 that has received a corresponding interrogation signal. In the illustrative embodiment, the destination computing devices 104 respond to the interrogation signal with identification data, which is received by the source computing device in block 516. The identification data uniquely identifies the responding destination computing devices 104 from the other destination computing devices 104. For example, the identification data may be embodied as data usable by the source computing device 102 to communicate directly with the responding destination computing device 104 such as, for example, an internet protocol address, a media access control address, and/or other identification data.

As discussed above, in some embodiments, the location detection signals and the interrogation signals are embodied as the same signal. In such embodiments, the source computing device 102 may transmit a location/identity detection signal (e.g., a radar signal) and receive a location detection response signal (i.e., a reflective signal) and an interrogation response signal from each of the destination computing devices 104.

In bock 518, the source computing device 102 determines the presence (i.e., location and identity) of each responding destination computing device 104. For example, in block 520, the source computing device 102 determines the location of the responding destination computing device 104 relative to the source computing device 102. As discussed above, the source computing device 102 may use any suitable methodology or technology to determine the relative location of the responding destination computing devices 104 in two- or three-dimensions. For example, in the illustrative embodiment, the source computing device 102 determines the relative location of each responding destination computing device 104 using signal triangulation of antenna signals produced by the receiver 232 of the location detection circuit 222. In embodiments in which the transmitter 230 and the transmitter 240 are different transmitters (e.g., the location detection circuit 222 is embodied as a MIR circuit and the identity detection circuit 224 is embodied as a separate RFID circuit), the source computing device 102 may further correlate the location detection response signals and the interrogation response signals received from each destination computing device 104 in block 520.

Additionally, in some embodiments, the source computing device 102 may also determine the motion of the responding destination computing devices 104 in block 522. To do so, the source computing device 102 may compare the determined current location of the responding destination computing devices 104 to prior determined locations. In so doing, the source computing device 102 may determine any suitable metric of movement such as velocity, direction, acceleration, or other metric. Further, in some embodiments, the source computing device 102 may utilize the determined movement of the destination computing devices 104 to improve the accuracy of the determined current location and/or predict or infer a future location of the respective responding destination computing devices 104.

In block 524, the source computing device 102 stores the presence data for each of the responding destination computing devices 104. For example, the source computing device 102 may store location data that identifies the determined relative location of each responding destination computing devices in block 526 and the identification data received from each responding destination computing device in block 528. The location data and identification data may be stored in association with each other in any suitable storage location such as the memory 206 or a data drive of the peripheral devices 218.

After the current presence data has been stored in block 516, the method 500 loops back to block 504 in which the source computing device 102 again detects the location and indent of each destination computing device 104. In this way, the source computing device 102 may continually, periodically, or responsively determine the presence of the destination computing devices 104.

Figure 6:
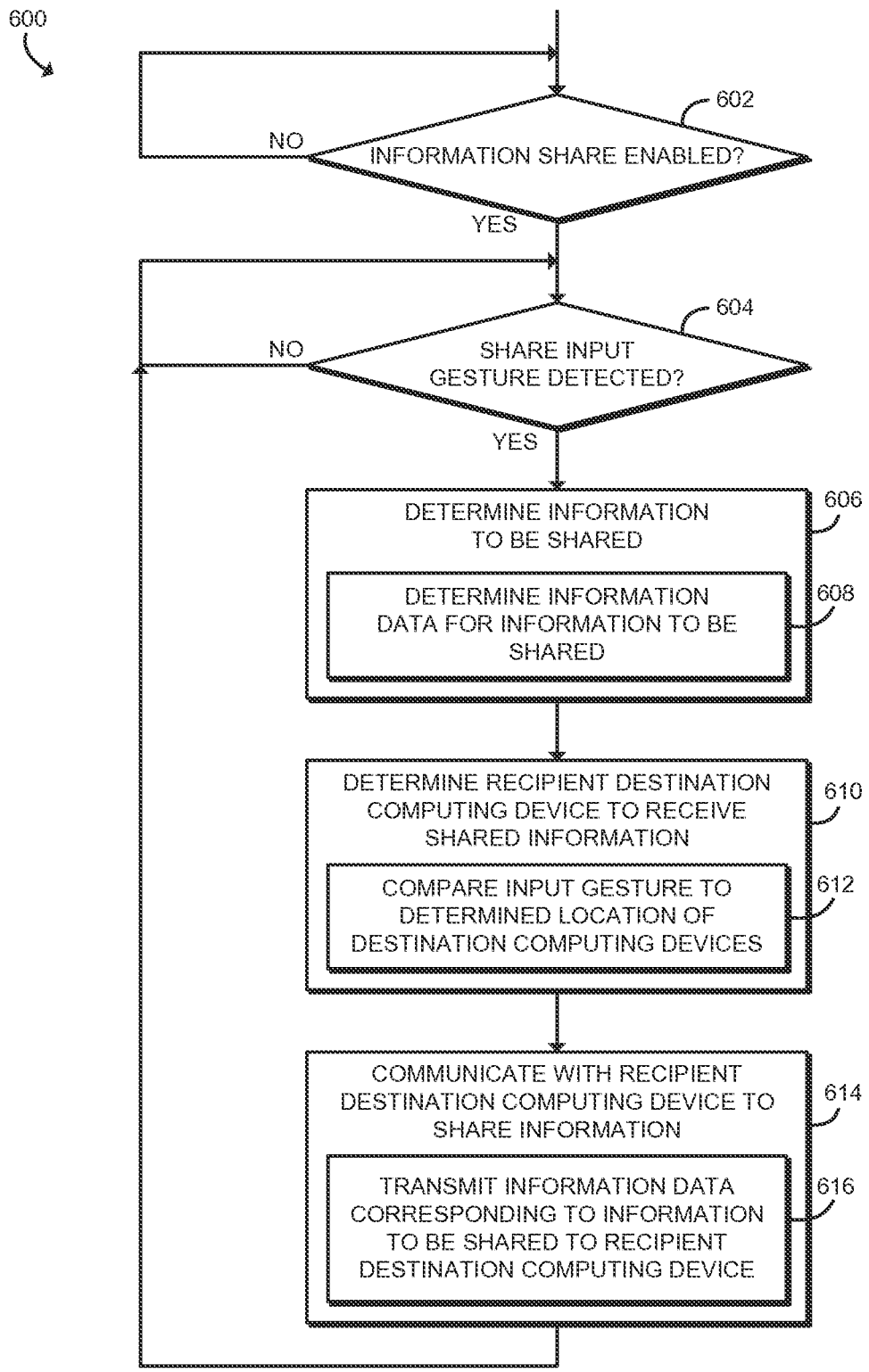
FIG. 6 is a simplified flow diagram of at least one embodiment of a method for sharing information between the computing devices of the system of FIG. 1.

Referring now to FIG. 6, in use, the source computing device 102 may execute a method 600 for sharing information with one or more of the destination computing devices 104. The method 600 begins with block 602 in which the source computing device 102 determines whether the sharing of information with the destination computing devices 104 has been enabled. That is, in some embodiments, a user of the source computing device 102 may selectively enable or disable the ability to share information with the destination computing devices 104 in the manner discussed below.

Figure 7:
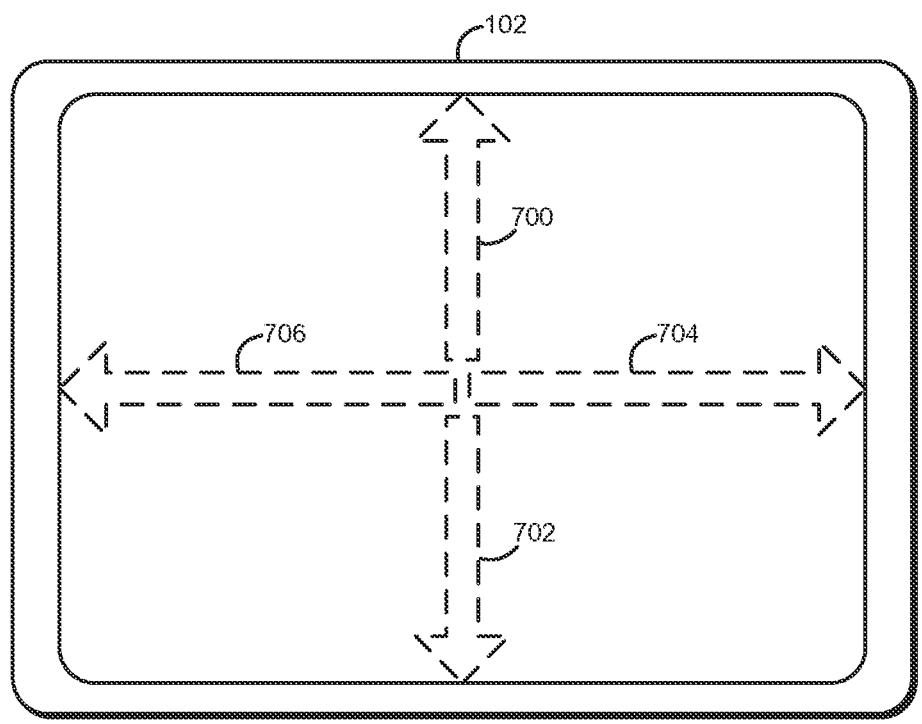
FIGS. 7 and 8 are simplified representations of share input gestures that may be used with the source computing device of FIGS. 2 and 3 to share information with a destination computing device of the system of FIG. 1.

If the sharing of information has been enabled, the method 600 advances to block 604 in which the source computing device 102 determines whether a share input gesture has been detected. That is, the user of the source computing device 102 may share information currently located on the source computing device 102 with one of the destination computing devices 104 using a tactile or non-tactile input gesture supplied to the source computing device 102 via the input gesture system (e.g., via the touchscreen display 210). The particular input gesture used to share information may be embodied as any type of gesture from which the source computing device 102 can determine or infer a recipient destination computing device 104 to receive the shared information. For example, in some embodiments, the input gesture is embodied as, or otherwise includes, a tactile swipe gesture. In such embodiments, the user indicates a desire to share the information by selecting the information and swiping the information toward, or otherwise in the direction of, the desired destination computing device 104 using the touchscreen display 210. For example, as shown in FIG. 7, the user may use a forward swipe gesture 700 to share information with a destination computing device 104 located forward of the source computing device 102, a backward swipe gesture 702 to share information with a destination computing device 104 located backward of the source computing device, a right swipe gesture 704 to share information with a destination computing device 104 located to the right of the source computing device 102, or a left swipe gesture 706 to share information with a destination computing device 104 located the left of the source computing device 102. Of course, many other types of swipe input gestures may be used depending on the relative location of the desired destination computing device 104.

Figure 8:
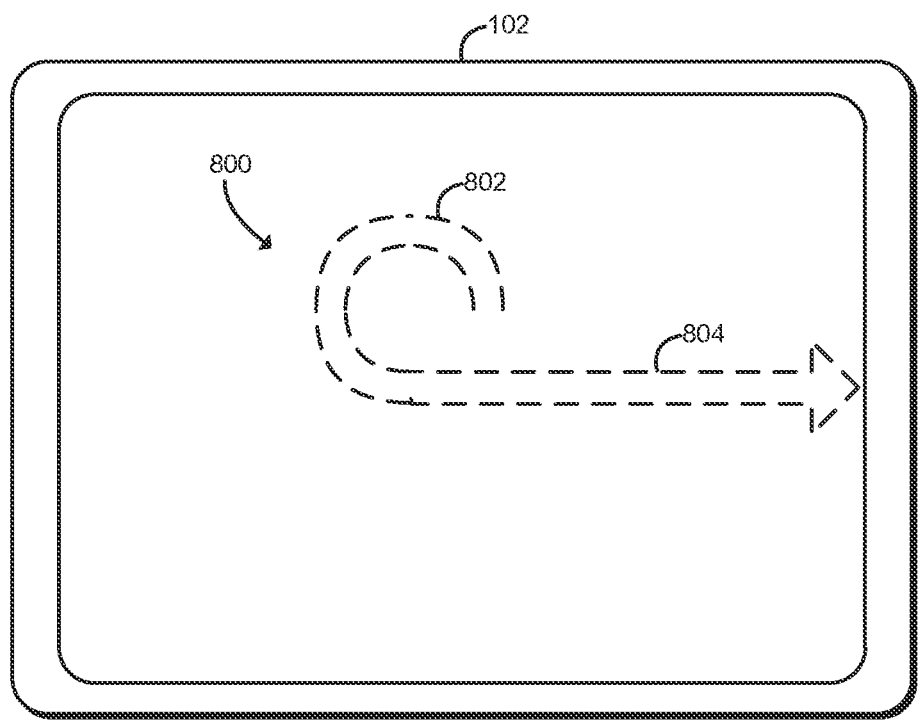

In some embodiments, the input gesture may include a selection gesture to indicate that the user desires to share information and a direction gesture that indicates the general direction of the desired destination computing device 104. For example, in some embodiments, the user may select the information to be shared (e.g., picture, video, link, document, etc.) by moving information toward the center of the touchscreen 212 and then swipe the information toward the desired destination computing device 104. In such embodiments, the computing device 102 determines that the user desires to share the information based on the movement of the information toward the center of the touchscreen 212 (i.e., the selection gesture) and infers the desired destination computing device 104 based on the direction of the swipe gesture (i.e., the direction gesture). For example, an embodiment of an input gesture 800 is shown in FIG. 8. The input gesture 800 includes a selection gesture 802, which is illustratively embodied as a circular input gesture. As such, the user selects the information to be shared by moving the information in a circular pattern. The input gesture 800 also includes a direction gesture 804 illustratively embodied as a swipe gesture, which is directed toward the desired destination computing device 104. In the illustrative embodiment, the desired destination computing device 104 is located toward the right of the source computing device 102. Of course, in other embodiments, the input gesture 800, and other input gestures described above, may be used to share information with a destination computing device 104 located in other positions relative to the source computing device 102.

Referring back to FIG. 6, if an input gesture is detected in block 604, the method 600 advances to block 606 in which the source computing device 102 determines the information to be shared. The source computing device 102 determines the information to be shared based on the information selected by the input gesture in block 604. As discussed above, any type of information may be shared between the source computing device 102 and the destination computing devices 104 including, but not limited to, pictures, videos, music, documents, web links, files, application data, control data, and/or other media or digital content.

In block 608, the source computing device 102 determines information data usable by the recipient destination computing device 104 to access, generate, or otherwise produce the information to be shared. For example, as discussed above, the information data may be embodied as location data that identifies a location (e.g., a web address) from which the desired destination computing device 104 may access or retrieve the information. For example, the location data may be embodied as a uniform resource locator of an online website or location from which the information may be downloaded by the destination computing device 104. Of course, the location data may be embodied as other types of data in other embodiments based on the type of information to be shared and/or the particular location. For example, in a networked environment, the location data may be embodied as a file location on a networked drive or computer. Additionally, the location data may include additional data such as passwords or security keys required to access the information at the location identified by the location data. Of course, in other embodiments, the information data may be embodied as, or otherwise include, as application data that causes execution of and/or controls the behavior of an application stored on the recipient destination computing device 104 to present the information to be shared to a user of the recipient destination computing device 104, as the information to be shared and presented to the user, and/or as any other type of information usable by the recipient destination computing device 104 to access, or otherwise produce, the information to be shared.

In block 610, the source computing device 102 determines the recipient destination computing device 104 to receive the shared information. To do so, in block 612, the source computing device 102 compares the input gesture to the determined locations of the destination computing devices 104 to determine or infer which destination computing device 104 is the recipient destination computing device 104. For example, the source computing device 102 may determine or infer the recipient destination computing device 104 as the destination computing device 104 to which the input gesture was directed based on the determined current locations of the destination computing devices 104.

After the recipient destination computing device 104 has been determined, the source computing device 102 communicates with the recipient destination computing device 104 to share the information in block 614. To do so, the source computing device 102 transmits the information data to the recipient destination computing device 104 in block 616. In some embodiments, the source computing device 102 may transmit the information data using a communication link (e.g., communication link 122) different from the communication link 120 used to transmit and receive the interrogation signals. It should be appreciated, however, that because the information data is relatively small in size, the communication link used to transmit the information data may be embodied as a low bandwidth and/or low range communication link. After the information data has been transmitted to the recipient destination computing device 104 in block 616, the method 600 loops back to block 604 in which the source computing device 102 monitors for another share input gesture from the user.

Figure 9:
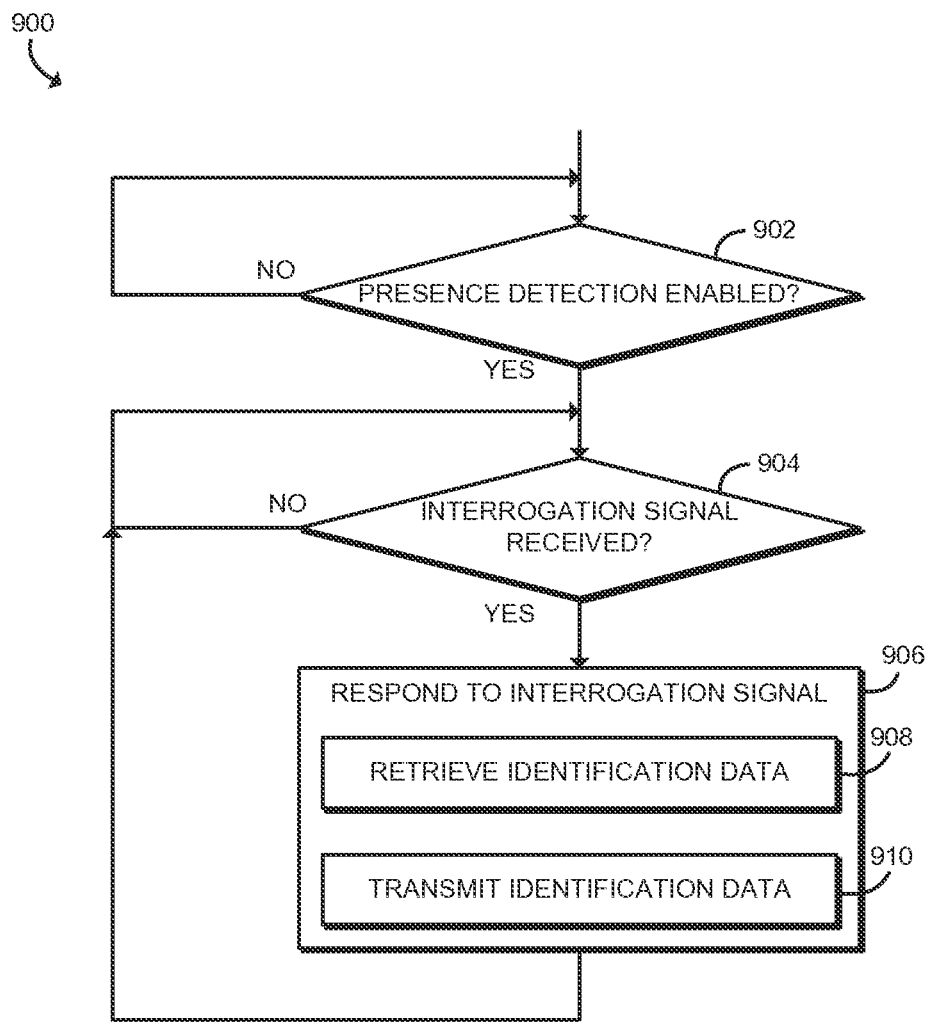
FIG. 9 is a simplified flow diagram for responding to an interrogation signal that may be executed by the destination computing devices of the system of FIG. 1.

Referring now to FIG. 9, in use, each of the destination computing devices 104 may execute a method 900 for responding to interrogation signals received from the source computing device 102. The method 900 begins with block 902 in which the destination computing device 104 determines whether presence detection has been enabled on the destination computing device 104. That is, in some embodiments, a user of the destination computing device 104 may selectively enable or disable participation in the system 100 (i.e., responding to the interrogation signals received from the source computing device 102). If presence detection has been enabled on the destination computing device 104, the method 900 advances to block 904 in which the destination computing device 104 determines whether an interrogation signal has been received from the source computing device 102. If not, the method 900 loops back to block 904 in which the destination computing device 104 continues monitoring for interrogation signals.

However, if an interrogation signal has been received, the method 900 advances to block 906 in which the destination computing device responds to the interrogation signal. To do so, the destination computing device 104 may retrieve identification data from a local data storage location of the destination computing device 104. As discussed above, the identification data uniquely identifies the destination computing device 104 from other destination computing devices and may be embodied as any type of data capable of doing so (e.g., an internet protocol address, a media control access address, a globally unique identifier, etc.). In block 910, the destination computing device 104 transmits the identification data to the source computing device 102 in response to the interrogation signal. After transmission of the identification data in block 910, the method 900 loops back to block 904 in which the destination computing device 104 continues monitoring for interrogation signals.

Figure 10:
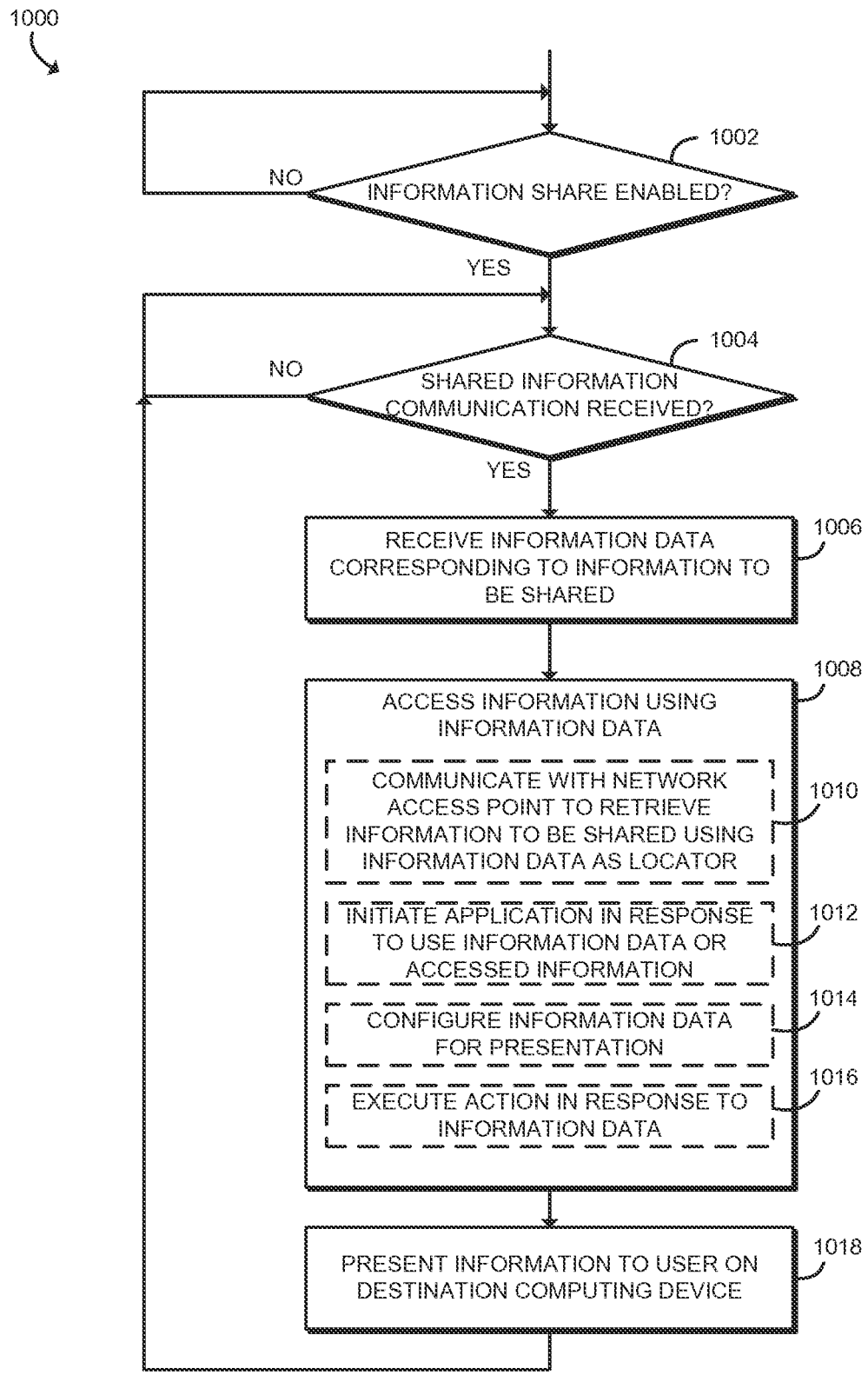
FIG. 10 is a simplified flow diagram for accessing shared information that may be executed by a recipient destination computing device of the system of FIG. 1.

Referring now to FIG. 10, in use, a recipient destination computing device 104 may execute a method 1000 for accessing shared information. The method 1000 begins with block 1002 in which the destination computing device 104 determines whether the sharing of information on the destination computing device 104 has been enabled. That is, in some embodiments, a user of the destination computing device 104 may selectively enable or disable the ability to receive shared information from the source computing device 102.

If the sharing of information has been enabled, the method 1000 advances to block 1004 in which the destination computing device 104 determines whether a shared information communication has been received from the source computing device 102. If so, the destination computing device 104 receives the information data corresponding to the information to be shared from the source computing device in block 1006. As discussed above, the information data is usable by the recipient destination computing device 104 to access, generate, or otherwise produce the information to be shared. As such, in block 1008, the recipient destination computing device 104 accesses the information to be shared using the received information data. For example, in embodiments in which the information data is embodied as, or otherwise includes, location data identifying a location from which the recipient destination computing device 104 can access the shared information, the recipient destination computing device 104 may access the network access point 108 (see FIG. 1) to retrieve the information from the identified location in the network 110 (e.g., a remote website or data server) in block 1010. Alternatively, in a local network environment, the destination computing device 104 may access a networked data storage or computer device to access the information. Accordingly, based on the type of location data and structure of the system 100, the destination computing device 104 may utilize any suitable methodology to retrieve, download, or otherwise access the shared information.

In embodiments in which the information data is embodied as, or otherwise includes, application data, the recipient destination computing device 104 may initiate an application and/or control behavior of an application of the recipient destination computing device 104 using the information data in block 1012. For example, the information data may cause the destination computing device 104 to execute an application in a particular configuration or setting (e.g., a game executed in "hard" mode) based on the information data.

Additionally or alternatively, if the information to be shared is of a small size, the information data may embody, or otherwise include, the particular information to be shared. For example, in some embodiments, the source and destination computing devices 102, 104 may be configured to execute gaming applications in which small amounts of data are transferred between each other (e.g., a "hot potato" game). In such embodiments, the information data (e.g., a picture of a potato) may be configured for presentation (e.g., unpacked or decrypted) in block 1014. Further, in some embodiments, the recipient destination computing device 104 may be configured to perform some additional or other action in response to receipt of the information data in block 1016.

After the information has been retrieved, generated, or otherwise produced using the information data, the shared information is presented to the user of the destination computing device 104 in block 1018. Depending on the type of information shared, the information may be presented to the user in any suitable manner (e.g., displayed on a display of the destination computing device 104). After the information has been presented to the user, the method 1000 loops back to block 1004 in which the destination computing device 104 continues to monitor for new shared information communications from the source computing device 102.

Figure 11:
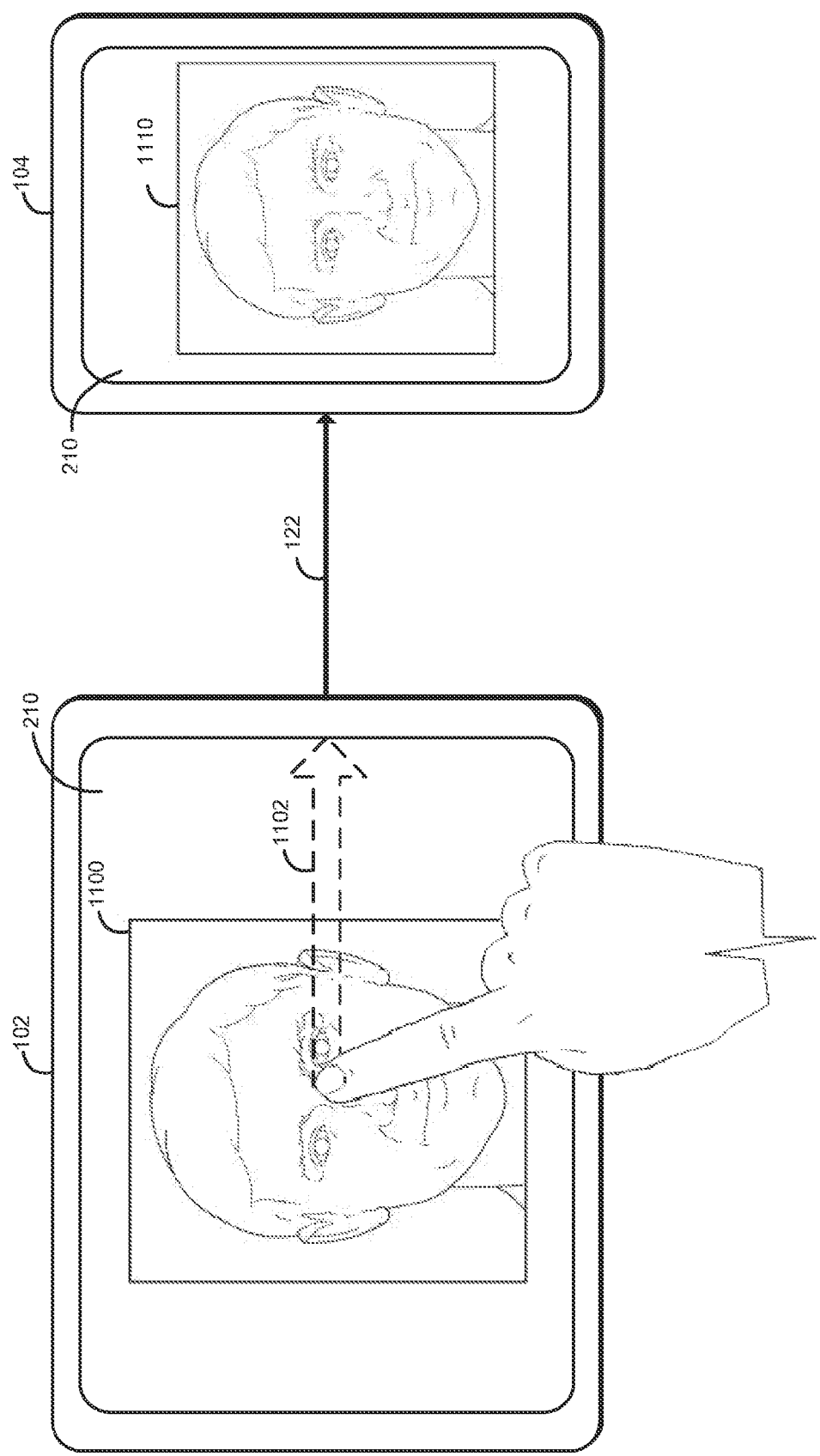
FIG. 11 is a simplified illustration of two computing devices of the system of FIG. 1 sharing information therebetween.

Accordingly, using the technologies described above, a user of the source computing device 102 may quickly share information with one or more of the destination computing devices 104. A representation of one embodiment of the sharing of information using the technologies described herein is shown in FIG. 11. A user of the source computing device 102 may share a picture 1100 with a recipient destination computing device 104. To do so, the user of the source computing device 102 swipes the picture 1100 toward, or in the direction of, the recipient destination computing device 104 using a swipe input gesture 1102. The source computing device 102 transmits information data usable by the recipient destination computing device 104 to access the picture 1100. In the illustrative embodiment, the information data is embodied as location data that identifies a location of the picture 1100 from which the destination computing device can access the picture 1110 using the communication link 122. In response to receiving the information location data, the recipient destination computing device 104 retrieves the picture 1110 from the location identified by the information location data (e.g., a location in the network 110) and displays the retrieved picture 1110 to a user of the recipient destination computing device 104.

EXAMPLES

Illustrative examples of the technologies disclosed herein are provided below. An embodiment of the technologies may include any one or more, and any combination of, the examples described below.

Example 1 includes a computing device for sharing information with other computing devices, the computing device comprising an input gesture system to receive input gestures from a user of the computing device; a presence detection module to determine a location of at least one of the other computing devices; and an information share module to (i) detect an input gesture received from a user via the input gesture system, (ii) identify a recipient computing device of the other computing devices based on the detected input gesture and the determined location of the at least one other computing device, and (iii) determine information data usable by the recipient computing device to access the information to be shared; and a communication module to transmit the information data to the recipient computing device.

Example 2 includes the subject matter of Example 1, and wherein the input gesture system comprises a touchscreen display to receive a tactile input gesture.

Example 3 includes the subject matter of any of Examples 1 and 2, and wherein the input gesture comprises a swipe gesture having a swipe direction corresponding to the relative location of the at least one other computing device.

Example 4 includes the subject matter of any of Examples 1-3, and wherein the swipe gesture comprises a swipe gesture originating toward a middle of the touchscreen display and ending toward one of a top, bottom, left side, or right side of the touchscreen display.

Example 5 includes the subject matter of any of Examples 1-4, and wherein the input gesture comprises (i) a selection input gesture that identifies a user's desire to share information and (ii) a direction input gesture that identifies the direction of the recipient computing device relative to the computing device.

Example 6 includes the subject matter of any of Examples 1-5, and wherein the input gesture comprises a non-tactile input gesture.

Example 7 includes the subject matter of any of Examples 1-6, and wherein the input gesture system comprises at least one sensor to detect the non-tactile input gesture.

Example 8 includes the subject matter of any of Examples 1-7, and wherein the presence detection module is to transmit a radar signal to the plurality of other computing devices; receive a reflection signal from the at least one of the other computing devices in response to the radar signal; and determine the location of the at least one other computing device relative to the computing device based on the received reflection signal.

Example 9 includes the subject matter of any of Examples 1-8, and wherein the presence detection module comprises a micropower impulse radar circuit.

Example 10 includes the subject matter of any of Examples 1-9, and wherein the presence detection module comprises an antenna array including a plurality of antennas and the antenna array is to receive the reflection signal from the at least one of the plurality of computing devices.

Example 11 includes the subject matter of any of Examples 1-10, and wherein the presence detection module is to transmit an interrogation signal to the plurality of other computing devices; and receive a response signal from the at least one of the plurality of computing devices in response to the interrogation signal.

Example 12 includes the subject matter of any of Examples 1-11, and wherein the response signal comprises identification data that uniquely identifies the at least one other computing device.

Example 13 includes the subject matter of any of Examples 1-12, and wherein the presence detection module is to communicate with the at least one other computing device using the identification data.

Example 14 includes the subject matter of any of Examples 1-13, and wherein the presence detection module comprises a radio frequency identification signal transmitter and the interrogation signal comprises a radio frequency identification signal.

Example 15 includes the subject matter of any of Examples 1-14, and wherein the presence detection module comprises an antenna array including a plurality of antennas and the antenna array is to receive the response signal from the at least one of the plurality of computing devices.

Example 16 includes the subject matter of any of Examples 1-15, and wherein the presence detection module is further to determine whether the at least one of the plurality of other computing devices is moving.

Example 17 includes the subject matter of any of Examples 1-16, and wherein the information data comprises location data that identifies a location of the information to be shared from which the recipient computing device can access the information.

Example 18 includes the subject matter of any of Examples 1-17, and wherein the location data comprises a uniform resource locator from which the recipient computing device can access the information.

Example 19 includes the subject matter of any of Examples 1-18, and wherein the information data comprises application data that controls a behavior of an application stored on the computing device.

Example 20 includes the subject matter of any of Examples 1-19, and wherein the information module is to compare the input gesture and the relative location of the at least one other computing device to identify the recipient computing device.

Example 21 includes the subject matter of any of Examples 1-20, and wherein the information share module is to determine the information to be shared based on a user's selection.

Example 22 includes the subject matter of any of Examples 1-21, and wherein the information share module is to determine the information to be shared based on the input gesture.

Example 23 includes the subject matter of any of Examples 1-22, and wherein the communication module is to transmit the information data to the recipient computing device using a communication link different from a communication link used by the other computing device to access the information.

Example 24 includes the subject matter of any of Examples 1-23, and wherein the communication module is to transmit the information data to the recipient computing device using a network access point.

Example 25 includes a method for sharing information between computing devices, the method comprising determining, on a source computing device, a location of at least one of a plurality of destination computing devices relative to the source computing device; detecting, on the source computing device, an input gesture received from a user via an input gesture system of the source computing device; identifying, on the source computing device, a recipient computing device of the plurality of destination computing devices to receive the shared information based on the detected input gesture and the relative location of the recipient destination computing device; determining, on the source computing device, information data usable by the recipient computing device to access the information to be shared; and communicating with the recipient computing device to transmit the information data from the source computing device to the recipient computing device.

Example 26 includes the subject matter of Example 25, and wherein detecting the input gesture comprises detecting a tactile input gesture using a touchscreen display of the source computing device.

Example 27 includes the subject matter of any of Examples 25 and 26, and wherein detecting the input gesture comprises detecting a swipe gesture, via the touchscreen display, having a swipe direction corresponding to the relative location of the at least one destination computing device.

Example 28 includes the subject matter of any of Examples 25-27, and wherein detecting the swipe gesture comprises detecting a swipe gesture originating toward a middle of the touchscreen display and ending toward one of a top, bottom, left side, or right side of the touchscreen display.

Example 29 includes the subject matter of any of Examples 25-28, and wherein detecting the input gesture comprises detecting an input gesture comprising (i) a selection input gesture that identifies a user's desire to share information and (ii) a direction input gesture that identifies the direction of the recipient computing device to receive the shared information relative to the source computing device.

Example 30 includes the subject matter of any of Examples 25-29, and wherein detecting the input gesture comprises detecting a non-tactile input gesture.

Example 31 includes the subject matter of any of Examples 25-30, and wherein detecting the non-tactile input gesture comprises detecting a non-tactile gesture using at least one sensor of the input gesture system.

Example 32 includes the subject matter of any of Examples 25-31, and wherein determining the location of the at least one destination computing device comprises transmitting a radar signal to the at least one destination computing device; receiving a reflection signal from the at least one destination computing device in response to the radar signal; and determining the location of the at least one destination computing device relative to the source computing device based on the received reflection signal.

Example 33 includes the subject matter of any of Examples 25-32, and wherein transmitting the radar signal comprises transmitting a radar signal using a micropower impulse radar circuit of the presence detection module.

Example 34 includes the subject matter of any of Examples 25-33, and wherein receiving the reflection signal comprises receiving the reflection signal with a plurality of antennas of an antenna array of the source computing device.

Example 35 includes the subject matter of any of Examples 25-34, and wherein determining the location of the at least one destination computing device comprises transmitting an interrogation signal to the at least one destination computing device; and receiving a response signal from the at least one destination computing device in response to the interrogation signal.

Example 36 includes the subject matter of any of Examples 25-35, and wherein receiving the response signal comprises receiving a response signal that comprises identification data that uniquely identifies the at least one destination computing device.

Example 37 includes the subject matter of any of Examples 25-36, and wherein communicating with the recipient computing device comprises communicating with the at least one destination computing device using the identification data.

Example 38 includes the subject matter of any of Examples 25-37, and wherein transmitting the interrogation signal comprises transmitting a radio frequency identification signal.

Example 39 includes the subject matter of any of Examples 25-38, and wherein receiving the response signal comprises receiving the response signal with a plurality of antennas of an antenna array of the source computing device.

Example 40 includes the subject matter of any of Examples 25-39, and wherein determining the location of the at least one of the plurality of destination computing devices comprises determining whether the at least one of the plurality of destination computing devices is moving.

Example 41 includes the subject matter of any of Examples 25-40, and wherein determining the information data comprises determining location data that identifies a location of the information to be shared from which the recipient computing device can access the information.

Example 42 includes the subject matter of any of Examples 25-41, and wherein determining the location data comprises determining a uniform resource locator from which the recipient computing device can access the information.

Example 43 includes the subject matter of any of Examples 25-42, and wherein identifying the recipient computing device comprises comparing the input gesture and the relative location of the at least one destination computing device.

Example 44 includes the subject matter of any of Examples 25-43, and wherein determining the information data comprises determining the information to be shared based on a user's selection.

Example 45 includes the subject matter of any of Examples 25-44, and wherein determining the information to be shared comprises determining the information to be shared based on the input gesture.

Example 46 includes the subject matter of any of Examples 25-45, and wherein communicating with the recipient computing device comprises transmitting the information data from the source computing device to the recipient computing device using a communication link different from a communication link used by the destination computing device to access the information.

Example 47 includes the subject matter of any of Examples 25-46, and wherein communicating with the recipient computing device comprises transmitting the information data via a network access point.

Example 48 includes a computing device comprising a processor; and a memory having stored therein a plurality of instructions that when executed by the processor cause the computing device to perform the method of any of Examples 25-47.

Example 49 includes one or more machine readable storage media comprising a plurality of instructions stored thereon that in response to being executed result in a computing device performing the method of any of Examples 25-47.

Example 50 includes a source computing device for sharing information with other computing devices, the computing device comprising means for determining a location of at least one of a plurality of destination computing devices relative to the source computing device; means for detecting an input gesture received from a user via an input gesture system of the source computing device; means for identifying a recipient computing device of the plurality of destination computing devices to receive the shared information based on the detected input gesture and the relative location of the recipient destination computing device; means for determining information data usable by the recipient computing device to access the information to be shared; and means for communicating with the recipient computing device to transmit the information data from the source computing device to the recipient computing device.

Example 51 includes the subject matter of Example 50, and wherein the means for detecting the input gesture comprise means for detecting a tactile input gesture using a touchscreen display of the source computing device.

Example 52 includes the subject matter of any of Examples 50 and 51, and wherein the means for detecting the input gesture comprises means for detecting a swipe gesture having a swipe direction corresponding to the relative location of the at least one destination computing device.

Example 53 includes the subject matter of any of Examples 50-52, and wherein the means for detecting the swipe gesture comprises means for detecting a swipe gesture originating toward a middle of the touchscreen display and ending toward one of a top, bottom, left side, or right side of the touchscreen display.

Example 54 includes the subject matter of any of Examples 50-53, and wherein the means for detecting the input gesture comprises means for detecting an input gesture comprising (i) a selection input gesture that identifies a user's desire to share information and (ii) a direction input gesture that identifies the direction of the recipient computing device to receive the shared information relative to the source computing device.

Example 55 includes the subject matter of any of Examples 50-54, and wherein the means for detecting the input gesture comprises means for detecting a non-tactile input gesture.

Example 56 includes the subject matter of any of Examples 50-55, and wherein the means for detecting the non-tactile input gesture comprises means for detecting a non-tactile gesture using at least one sensor of the input gesture system.

Example 57 includes the subject matter of any of Examples 50-56, and wherein the means for determining the location of the at least one destination computing device comprises means for transmitting a radar signal to the at least one destination computing device; means for receiving a reflection signal from the at least one destination computing device in response to the radar signal; and means for determining the location of the at least one destination computing device relative to the source computing device based on the received reflection signal.

Example 58 includes the subject matter of any of Examples 50-57, and wherein the means for transmitting the radar signal comprises means for transmitting a radar signal using a micropower impulse radar circuit of the presence detection module.

Example 59 includes the subject matter of any of Examples 50-58, and wherein the means for receiving the reflection signal comprises means for receiving the reflection signal with a plurality of antennas of an antenna array of the source computing device.

Example 60 includes the subject matter of any of Examples 50-59, and wherein the means for determining the location of the at least one destination computing device comprises means for transmitting an interrogation signal to the at least one destination computing device; and means for receiving a response signal from the at least one destination computing device in response to the interrogation signal.

Example 61 includes the subject matter of any of Examples 50-60, and wherein the means for receiving the response signal comprises means for receiving a response signal that comprises identification data that uniquely identifies the at least one destination computing device.

Example 62 includes the subject matter of any of Examples 50-61, and wherein the means for communicating with the recipient computing device comprises means for communicating with the at least one destination computing device using the identification data.

Example 63 includes the subject matter of any of Examples 50-62, and wherein the means for transmitting the interrogation signal comprises means for transmitting a radio frequency identification signal.

Example 64 includes the subject matter of any of Examples 50-63, and wherein the means for receiving the response signal comprises means for receiving the response signal with a plurality of antennas of an antenna array of the source computing device.

Example 65 includes the subject matter of any of Examples 50-64, and wherein the means for determining the location of the at least one of the plurality of destination computing devices comprises means for determining whether the at least one of the plurality of destination computing devices is moving.

Example 66 includes the subject matter of any of Examples 50-65, and wherein the means for determining the information data comprises means for determining location data that identifies a location of the information to be shared from which the recipient computing device can access the information.

Example 67 includes the subject matter of any of Examples 50-66, and wherein the means for determining the location data comprises means for determining a uniform resource locator from which the recipient computing device can access the information.

Example 68 includes the subject matter of any of Examples 50-67, and wherein the means for identifying the recipient computing device comprises means for comparing the input gesture and the relative location of the at least one destination computing device.

Example 69 includes the subject matter of any of Examples 50-68, and wherein the means for determining the information data comprises means for determining the information to be shared based on a user's selection.

Example 70 includes the subject matter of any of Examples 50-69, and wherein the means for determining the information to be shared comprises means for determining the information to be shared based on the input gesture.

Example 71 includes the subject matter of any of Examples 50-70, and wherein the means for communicating with the recipient computing device comprises means for transmitting the information data from the source computing device to the recipient computing device using a communication link different from a communication link used by the destination computing device to access the information.

Example 72 includes the subject matter of any of Examples 50-71, and wherein the means for communicating with the recipient computing device comprises means for transmitting the information data via a network access point.

Example 73 includes a computing device for receiving shared information from a source computing device, the method comprising a presence detection module to transmit a response signal in response to an interrogation signal received from the source computing device; a communication module to receive, from the source computing device and in response to transmission of the response signal, information data usable by the computing device to access the shared information; and an information share module to (i) access the shared information using the information data and (ii) present the information to a user of the computing device.

Example 74 includes the subject matter of Example 73, and wherein the interrogation signal comprises a radio frequency identification interrogation signal.

Example 75 includes the subject matter of any of Examples 73 and 74, and wherein the presence detection module is to transmit, in response to receipt of the interrogation signal, a response signal including identification data that uniquely identifies the computing device.

Example 76 includes the subject matter of any of Examples 73-75, and wherein the information data comprises location data that identifies a location of the shared information and the information share module is to (i) access, using the communication module, the location using the location data in response to receiving the location data from the source computing device and (ii) retrieve the shared information.

Example 77 includes the subject matter of any of Examples 73-76, and wherein the location data comprises a uniform resource locator from which the computing device can access the information.

Example 78 includes the subject matter of any of Examples 73-77, and wherein the information share module is to access the location using the location data without intervention from the user of the computing device.

Example 79 includes the subject matter of any of Examples 73-78, and wherein the information share module is to access the location using a communication link different from a communication link via which the interrogation signal was received.

Example 80 includes the subject matter of any of Examples 73-79, and wherein the information data comprises application data and the information share module is to execute an application of the computing device based on the application data.

Example 81 includes a method for receiving shared information from a source computing device, the method comprising responding, with a destination computing device, to an interrogation signal received from the source computing device; receiving, with the destination computing device and from the source computing device, information data usable by the computing device to access the shared information; accessing, with the destination computing device, the shared information using the information data; and presenting, on the destination computing device, the shared information to a user of the destination computing device.

Example 82 includes the subject matter of Example 81, and wherein responding to the interrogation signal comprises responding to a radio frequency identification interrogation signal.

Example 83 includes the subject matter of any of Examples 81 and 82, and wherein responding to the interrogation signal comprises transmitting a response signal including identification data that uniquely identifies the destination computing device.

Example 84 includes the subject matter of any of Examples 81-83, and wherein receiving the information data comprises receiving location data that identifies a location of the shared information, and wherein accessing the shared information comprises (i) accessing, using the communication module, the location using the location data in response to receiving the location data from the source computing device and (ii) retrieving the shared information.

Example 85 includes the subject matter of any of Examples 81-84, and wherein receiving the location data comprises receiving a uniform resource locator from which the destination computing device can access the information.

Example 86 includes the subject matter of any of Examples 81-85, and wherein accessing the location comprises accessing the location using the location data without intervention from the user of the destination computing device.

Example 87 includes the subject matter of any of Examples 81-86, and wherein accessing the location comprises accessing the location using a communication link different from a communication link via which the interrogation signal was received.

Example 88 includes the subject matter of any of Examples 81-87, and wherein receiving the information data comprises receiving application data, and wherein accessing the shared information comprises executing an application of the destination computing device based on the application data.

Example 89 includes a computing device comprising a processor; and a memory having stored therein a plurality of instructions that when executed by the processor cause the computing device to perform the method of any of Examples 81-88.

Example 90 includes one or more machine readable storage media comprising a plurality of instructions stored thereon that in response to being executed result in a computing device performing the method of any of Examples 81-88.

Example 91 includes a destination computing device for receiving shared information from a source computing device, the computing device comprising means for responding to an interrogation signal received from the source computing device; means for receiving, from the source computing device, information data usable by the computing device to access the shared information; means for accessing the shared information using the information data; and means for presenting the shared information to a user of the destination computing device.

Example 92 includes the subject matter of Example 91, and wherein the means for responding to the interrogation signal comprises means for responding to a radio frequency identification interrogation signal.

Example 93 includes the subject matter of any of Examples 91 and 92, and wherein the means for responding to the interrogation signal comprises means for transmitting a response signal including identification data that uniquely identifies the destination computing device.

Example 94 includes the subject matter of any of Examples 91-93, and wherein the means for receiving the information data comprises means for receiving location data that identifies a location of the shared information, and wherein the means for accessing the shared information comprises (i) means for accessing, using the communication module, the location using the location data in response to receiving the location data from the source computing device and (ii) means for retrieving the shared information.

Example 95 includes the subject matter of any of Examples 91-94, and wherein the means for receiving the location data comprises means for receiving a uniform resource locator from which the destination computing device can access the information.

Example 96 includes the subject matter of any of Examples 91-95, and wherein the means for accessing the location comprises means for accessing the location using the location data without intervention from the user of the destination computing device.

Example 97 includes the subject matter of any of Examples 91-96, and wherein the means for accessing the location comprises means for accessing the location using a communication link different from a communication link via which the interrogation signal was received.

Example 98 includes the subject matter of any of Examples 91-97, and wherein the means for receiving the information data comprises means for receiving application data, and wherein the means for accessing the shared information comprises means for executing an application of the destination computing device based on the application data.

The invention claimed is:

1. A computing device for sharing information with other computing devices, the computing device comprising:
   an input gesture system to receive input gestures from a user of the computing device;
   a presence detection module to (i) transmit a radar signal to at least one of the other computing devices, (ii) receive a reflection signal from the at least one of the other computing devices in response to the radar signal, and (iii) determine a location of the at least one of the other computing devices based on the received reflection signal; and
   an information share module to (i) detect an input gesture received from a user via the input gesture system, (ii) identify a recipient computing device of the other computing devices based on the detected input gesture and the determined location of the at least one other computing device, and (iii) determine information data usable by the recipient computing device to access the information to be shared; and
   a communication module to transmit the information data to the recipient computing device.

2. The computing device of claim 1, wherein the input gesture system comprises a touchscreen display to receive a tactile input gesture.

3. The computing device of claim 2, wherein the input gesture comprises a swipe gesture having a swipe direction corresponding to the relative location of the at least one other computing device.

4. The computing device of claim 1, wherein the input gesture comprises (i) a selection input gesture that identifies a user's desire to share information and (ii) a direction input gesture that identifies the direction of the recipient computing device relative to the computing device.

5. The computing device of claim 1, wherein the input gesture comprises a non-tactile input gesture and the input gesture system comprises at least one sensor to detect the non-tactile input gesture.

6. The computing device of claim 1, wherein the presence detection module comprises a micropower impulse radar circuit and a radio frequency identification circuit.

7. The computing device of claim 1, wherein the presence detection module is to:
   transmit an interrogation signal to the plurality of other computing devices; and
   receive a response signal from the at least one of the plurality of computing devices in response to the interrogation signal.

8. The computing device of claim 1, wherein the information data comprises location data that identifies a location of the information to be shared from which the recipient computing device can access the information.

9. The computing device of claim 8, wherein the location data comprises a uniform resource locator from which the recipient computing device can access the information.

10. The computing device of claim 1, wherein the information data comprises application data that controls a behavior of an application stored on the computing device.

11. The computing device of claim 1, wherein the presence detection module is further to:
   determine movement of the at least one other computing device; and
   predict a future position of the at least one other computing device based on the determined movement.

12. One or more machine readable storage media comprising a plurality of instructions stored thereon that, in response to being executed, cause a source computing device to:
   transmit a radar signal to at least one destination computing device;
   receive a reflection signal from the at least one destination computing device in response to the radar signal; and
   determine the location of the at least one destination computing device relative to the source computing device based on the received reflection signal;
   detect an input gesture received from a user via an input gesture system of the source computing device;
   identify a recipient computing device of the plurality of destination computing devices to receive the shared information based on the detected input gesture and the relative location of the recipient destination computing device;
   determine information data usable by the recipient computing device to access the information to be shared; and
   communicate with the recipient computing device to transmit the information data from the source computing device to the recipient computing device.

13. The machine readable storage media of claim 12, wherein to detect the input gesture comprises to detect a tactile input gesture using a touchscreen display of the source computing device.

14. The machine readable storage media of claim 12, wherein to detect the input gesture comprises to detect a non-tactile input gesture with a sensor of the input gesture system.

15. The machine readable storage media of claim 12, wherein to determine the location of the at least one destination computing device comprises to:
    transmit an interrogation signal to the at least one destination computing device; and
    receive a response signal from the at least one destination computing device in response to the interrogation signal, the response signal comprises identification data that uniquely identifies the at least one destination computing device.

16. The machine readable storage media of claim 12, wherein to determine the information data comprises to determine location data that identifies a location of the information to be shared from which the recipient computing device can access the information.

17. The machine readable storage media of claim 12, wherein to communicate with the recipient computing device comprises to transmit the information data from the source computing device to the recipient computing device using a communication link different from a communication link used by the destination computing device to access the information.

18. The machine readable storage media of claim 12, wherein the plurality of instructions further cause the source computing device to:
    determine a movement of the at least one destination computing device; and
    predict a future position of the at least one destination computing device based on the determined movement.

19. A method for sharing information between computing devices, the method comprising:
    transmitting, by a source computing device, a radar signal to at least one destination computing device;
    receiving, by the source computing device, a reflection signal from the at least one destination computing device in response to the radar signal; and
    determining, by the source computing device, the location of the at least one destination computing device relative to the source computing device based on the received reflection signal;
    detecting, on the source computing device, an input gesture received from a user via an input gesture system of the source computing device;
    identifying, on the source computing device, a recipient computing device of the plurality of destination computing devices to receive the shared information based on the detected input gesture and the relative location of the recipient destination computing device;
    determining, on the source computing device, information data usable by the recipient computing device to access the information to be shared; and
    communicating with the recipient computing device to transmit the information data from the source computing device to the recipient computing device.

20. The method of claim 19, wherein detecting the input gesture comprises detecting one of a tactile input gesture or a non-tactile input gesture with the input gesture system.

21. The method of claim 19, wherein determining the location of the at least one destination computing device comprises:
    transmitting an interrogation signal to the at least one destination computing device; and
    receiving a response signal from the at least one destination computing device in response to the interrogation signal, the response signal comprises identification data that uniquely identifies the at least one destination computing device.

22. The method of claim 19, wherein determining the information data comprises determining location data that identifies a location of the information to be shared from which the recipient computing device can access the information.

23. The method of claim 19, further comprising:
    determining, by the source computing device, a movement of the at least one destination computing device; and
    predicting, by the source computing device, a future position of the at least one destination computing device based on the determined movement.

24. A computing device for receiving shared information from a source computing device, the method comprising:
    a presence detection module to transmit a response signal in response to a radar signal received from the source computing device;
    a communication module to receive, from the source computing device and in response to transmission of the response signal, information data usable by the computing device to access the shared information; and
    an information share module to (i) access the shared information using the information data and (ii) present the information to a user of the computing device.

25. The computing device of claim 24, wherein the information data comprises location data that identifies a location of the shared information and the information share module is to (i) access, using the communication module, the location using the location data in response to receiving the location data from the source computing device and (ii) retrieve the shared information.

* * * * *